Oct. 30, 1934.  C. W. SPOHR  1,978,511
CAR AXLE DRIVING MECHANISM
Filed April 23, 1932   2 Sheets-Sheet 1
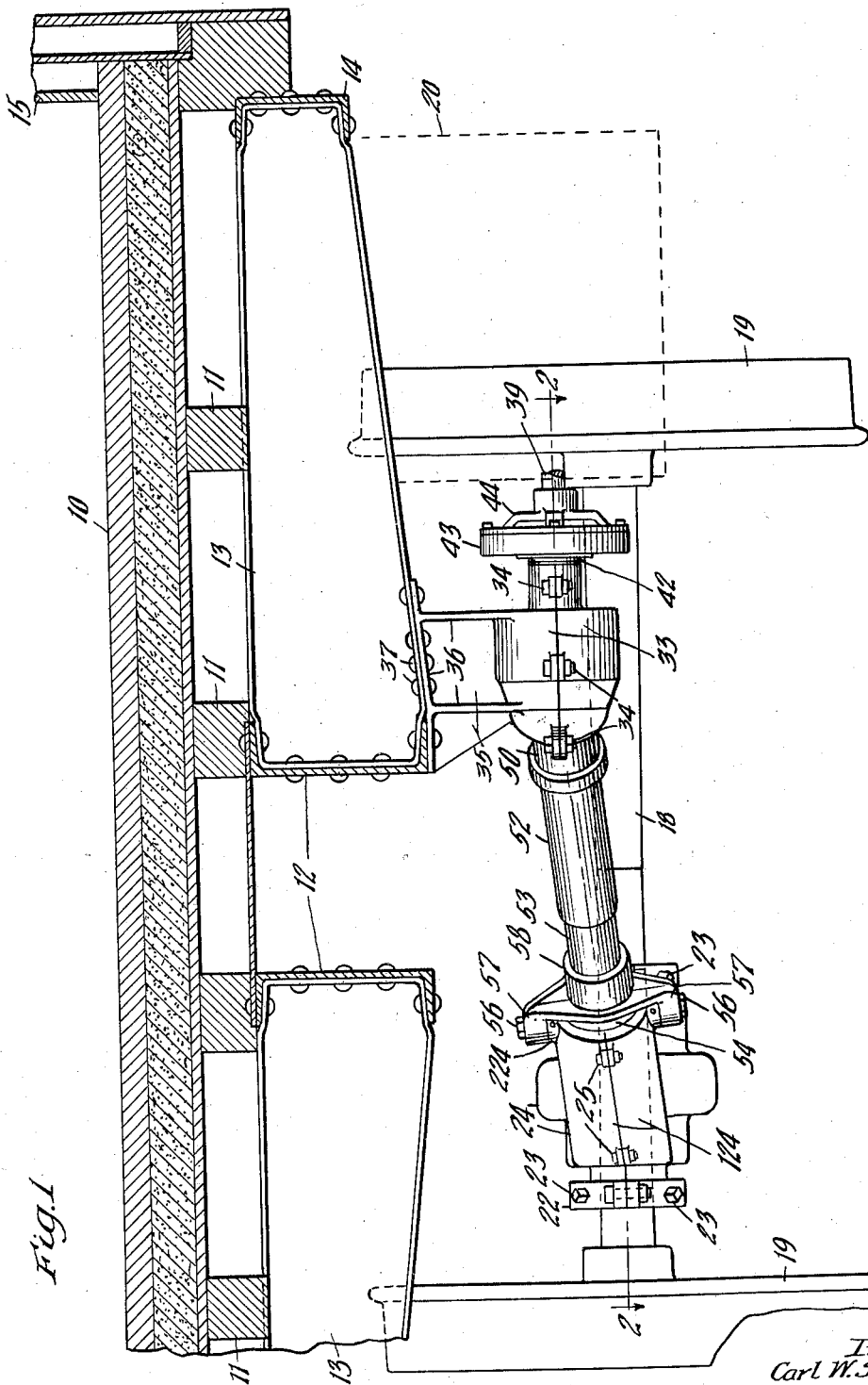
Inventor
Carl W. Spohr
By Joseph Harris
His Atty.

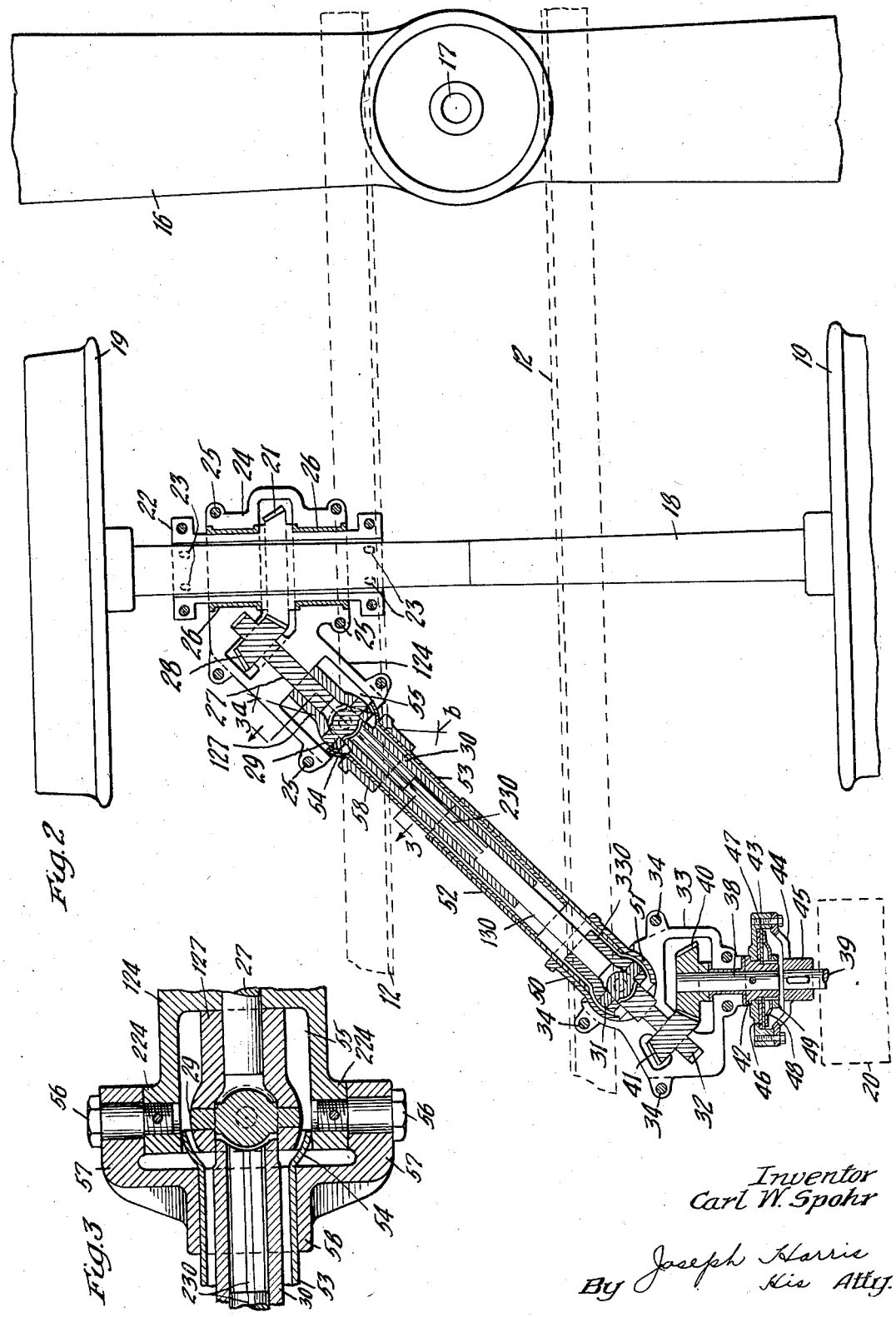

Patented Oct. 30, 1934

1,978,511

UNITED STATES PATENT OFFICE 1,978,511

CAR AXLE DRIVING MECHANISM

Carl W. Spohr, Chicago, Ill., assignor to Mechanical Refrigerated Car Company, Chicago, Ill., a corporation of Illinois Application April 23, 1932, Serial No. 607,045

5 Claims. (Cl. 105—118)

This invention relates to improvements in car axle driving mechanism and more particularly such a driving mechanism adapted to operate a compressor for a mechanically refrigerated car.

One object of this invention is to provide a car axle drive for efficiently transmitting, under all conditions of service, relatively heavy loads and capable of withstanding unusual or abnormal load conditions without danger of breakdown, the drive being primarily but not exclusively intended for operation of a compressor.

Another object of this invention is to provide a direct driving mechanism from an axle of a car truck to a mechanism to be driven, such as a compressor, wherein the drive may be applied without modification of the truck or any additions thereto such as brackets or supports heretofore commonly employed.

More specifically, an object of this invention is to provide a direct drive from a point on a car axle at one side of the car to a mechanism to be driven, such as a compressor, located at the opposite side of the car adjacent the truck, the drive being so arranged that, while automatically accommodating itself to all movements of the car axle relative to the car body, the angles formed between the jointed parts of the universally jointed shaft, are maintained within limits always insuring efficient transmission of the power and without imposing excessive stresses on the shaft parts.

Other objects of the invention will more clearly appear from the description and claims hereinafter following.

In the drawings forming a part of this specification, Figure 1 is a part elevational, part vertical sectional view of a refrigerator car showing the improvements applied thereto, the lower portion of the car body being shown in transverse vertical section and the drive mechanism being viewed in elevation endwise of the car. Figure 2 is a part top plan, part substantially horizontal sectional view of the drive and associated parts, the drive being shown in section corresponding to the section line 2—2 of Figure 1, and the center sills of the car being indicated in dotted lines. And Figure 3 is an enlarged, vertical sectional view, corresponding substantially to the section line 3—3 of Figure 2.

In said drawings, the insulated flooring of the refrigerator car is indicated at 10, the same being supported on stringers 11—11 in turn supported on the underframe structure comprised of the center sills 12—12, diaphragms or needle beams 13—13 and side sills 14. A portion of one of the insulated side walls is indicated at 15.

A portion of one of the car trucks is indicated conventionally, the bolster thereof being shown at 16, having the king pin opening 17 about the axis of which the truck as an entirety rotates relative to the car body in known manner. The inside axle of the truck is indicated at 18, the same having the usual wheels 19—19, it being deemed unnecessary to illustrate the usual side frames, spring planks, etc.

As customary in certain types of mechanically refrigerated cars, the compressor is supported from the underside of the car body or underframe near one side thereof, the location of said compressor being indicated conventionally by the dotted outline 20, which indicates roughly the casing and platform within which the compressor is usually mounted. As shown, said compressor is mounted at the righthand side of the car body, as viewed in Figure 1, and relatively close to the truck with sufficient clearance to avoid fouling therewith by the truck side frames when the truck swivels, as will be clear from Figure 2, where the compressor mounting is again indicated by the dotted lines 20.

In carrying out the invention, the axle 18 has secured thereto, near that end on the opposite side of the center sills or car body to that on which the compressor is located, a bevel gear 21 preferably formed integrally with a split sleeve 22 rigidly associated with the axle by any suitable means, such as the plurality of tightening bolts 23—23. The sleeve and its associated bevel gear 21 rotate within a split cast housing 24, the parts of which are adapted to be rigidly connected together by a plurality of bolts 25—25. Preferably, the housing 24 is provided with suitable anti-friction bushings 26 so as to minimize the friction when the axle and its associated sleeve rotate within said housing.

The bearing housing 24 is formed with a bearing section 124 extending at an angle to the axis and in a direction generally toward the compressor at the opposite side of the car and normally at an upwardly inclined angle, as clearly shown in Figures 1 and 2. Journaled in said bearing section 124, is a shaft 27 carrying a bevel gear 28 at its inner end in mesh with the bevel gear 21 so that, as the axle is rotated, said shaft 27 will be correspondingly rotated.

Rigidly and non-rotatably connected to the outer end of the shaft 27 is a supplemental shaft section 127 having a universal joint connection 29 with one section 30 of a telescoped extensible shaft, the other section of which is indicated by the reference character 130, and which is telescoped therewithin. As will be understood, while the two shaft sections 30 and 130 may slide or telescope with respect to each other, they are non-rotatably connected, preferably by a series of rib and groove formations 230. At its lefthand end, as viewed in Figure 2, the shaft section 130 is rigidly and non-rotatably connected to a supplemental shaft section 330, having a universal joint connection 31 with a shaft 32 journaled in another preferably split housing casting 33, said shaft 32 being alined with the shaft 27 when the axle 18 is in its normal position and on straight track.

The bearing housing 33, the parts of which may be rigidly secured together as by the bolts 34—34, is rigidly attached to the car underframe by any suitable means, such as the integrally formed webs and flanges 35—36, which are riveted to the corresponding adjacent needle beam 13, as indicated at 37. As will be noted, such fixed bearing housing 33 is on the same side of the longitudinal center line of the car as the compressor and in a position adjacent the compressor.

Also mounted in the fixed bearing housing 33 is a second shaft 38, which extends horizontally and transversely of the car and in alinement with the compressor shaft, a portion only of which is indicated at 39. At its inner end, the shaft 38 carries a bevel gear 40 meshing with the bevel gear 41, carried by the shaft 32.

The shaft 38 is preferably coupled or operatively associated with the compressor shaft 39 by an overload slip friction clutch. As shown, this clutch arrangement comprises a hub 42 rigidly connected to the shaft 38 and on which is rotatably mounted a flanged plate 43 bolted to arms 44, carried by another hub 45, keyed or otherwise non-rotatably connected to the compressor shaft 39. The flanged plate 43 preferably carries a fixed friction plate 46 on the inner side thereof with which cooperates another friction plate 47 slidably key connected to the hub 42 and adapted to be held in adjusted yieldable contact with the plate 46, through the intermediary of a flexible spring plate 48 and adjusting nut 49.

To minimize entrance of dirt or other foreign matter into the universal extensible shaft, the latter is preferably encased, the casing comprising an end sleeve 50 having a ball joint engagement with the bearing housing 33, as indicated at 51; a tubular sleeve 52 rigidly secured within the end sleeve 50; and another tubular sleeve 53, slidably telescoped within the sleeve 52, the sleeve 53 at its end nearest the axle being formed with an enlarged ball and cylindrical end 54, which works within a cylindrical recess 55 within the bearing extension 124.

Due to the fact that the bearing housing 24 is freely rotatable with respect to the axle 18, there would normally be a tendency for the angular extension 124 of said housing to fall down under the influence of gravity which would be accommodated by the universal extensible shaft, unless prevented. To prevent such action, the bearing extension 124 is preferably provided with upper and lower diametrically disposed enlargements 224—224, as shown in detail in Figure 3, into which are threaded two heavy pivot bolts 56—56 on which are pivotally mounted the arms 57—57 of a yoke piece, the hub 58 of which is welded or otherwise rigidly connected to the sleeve 53. The axis of the pivot bolts 56 is disposed in a vertical plane passing through the axis of the universal extensible shaft so that, as viewed in Figure 1, the universal extensible shaft 30—130 will be maintained in alinement, as viewed elevationally, with the shaft 27, while at the same time being free to accommodate itself to all of the turning and/or up and down movements of the driving axle with reference to the fixed bearing housing 33. In this manner, the drive is directly supported from the axle at the axle end, without the necessity of employing any extra brackets or supports secured to any part of the truck side frames, bolster, spring planks or the like.

With the drive illustrated and described, wherein the same extends directly from the axle at one side of the longitudinal center line of the car to the fixed bearing housing adjacent the compressor or other driven mechanism at the other side of the longitudinal center line of the car, the maximum angular movements of the truck with reference to the car body will necessitate only relatively minor angular movements between the shaft 27 and universal extensible shaft 30—130. The extreme movements of the center of the universal joint 29 are indicated at the points $a$ and $b$ in Figure 2, from which it will be seen that the maximum angular deflections referred to are comparatively small and hence permit of efficient transmission of the power without imposing excessive stresses in the parts, particularly the universal joints. It will also be seen that the improved drive may be applied to the axle of any truck regardless of the make of truck or its parts, thus insuring minimum cost of application. Further, by introducing an overload slip clutch, as described, any abnormal condition will be automatically taken care of without danger of breaking or rupturing any of the parts of the drive. Another advantage of the improved drive resides in the fact that the direct connection from the axle to the compressor or other driven mechanism is compact and will not interfere with any of the usual accessories found on the underside of refrigerator or other car bodies, such as the train line, air line, brake cylinders, brake rigging, etc.

Although the arrangement as herein shown and described is considered preferable, the same is merely illustrative and all changes and modifications are contemplated that come within the scope of the claims appended hereto.

What is claimed is:

1. In a railway car having a body, a truck pivotally connected thereto and a mechanism adapted to be driven, mounted on the underside of the car body near one side thereof; the combination with a bearing housing fixedly mounted on the car body adjacent said mechanism; of a shaft journaled therein; and a flexible extensible telescopic driving connection from said shaft to a point at the other side of the car on the nearest truck axle, said driving connection being supported at one end from said bearing housing and, at its other end, supported and maintained in operative position solely from and by said nearest truck axle.

2. In a railway car having a body, a truck pivotally connected thereto and a mechanism adapted to be driven, mounted on the underside of the car body near one side thereof; the combination with a gear secured to one of the truck axles near the wheel at the opposite side of the car; of a housing mounted on the axle and within which the latter is rotatable; a shaft extending diagonally from the axle and journaled in said housing and having a gear cooperable with the first named gear; a second bearing housing on the car body; a shaft journaled therein; driving gearing between said last named shaft and mechanism for actuating the latter; and an extensible shaft operatively connected at each end by a universal joint with said two first named shafts, said extensible shaft and first named diagonally extending shaft being supported and maintained in operative position independently of the truck other than said axle.

3. In a railway car having a body, a truck pivotally connected thereto and a mechanism adapted to be driven, mounted on the underside of a car body near one side thereof; the combination with a housing supported on one of the truck axles near the side of the car opposite to that on which said mechanism is located; of a driven shaft journaled in a fixed bearing carried by the car body adjacent said mechanism; a universally jointed, extensible shaft operatively connected at one end to said first named shaft and, at its other end, to the axle within said housing; and a yoke mounted on said extensible shaft and having pivotal connection with said axle housing.

4. In a railway car having a body, a truck pivotally connected thereto and a mechanism adapted to be driven mounted on the underside of the car body near one side thereof; the combination with a driven shaft mounted adjacent said mechanism and adapted to be operatively connected thereto; of a flexible extensible driving connection between said shaft and the nearest truck axle, said connection extending diagonally from said shaft to a point on the axle adjacent the wheel thereon at the opposite side of the car; and a casing for said extensible driving connection, said casing being also extensible and adjustable to accommodate the movements of said extensible driving connection.

5. In a railway car having a body, a truck pivotally connected thereto and a mechanism adapted to be driven, said mechanism being mounted on the underside of the car body at one side of the center line thereof, the combination with a driving shaft for said mechanism extending transversely of the car and disposed to the same side of the center line as the mechanism; of a driving gear mounted on the nearest axle of said truck adjacent the wheel thereof on the opposite side of the center line of the car; a bearing housing loosely relatively, rotatively mounted on said axle and enclosing said gear; a shaft journaled in said housing and having a gear in driving relation with said first named gear, said shaft normally extending upwardly and at an angle to the axle in a direction toward the opposite side of the center line of the car; and a telescopic, extensible shaft normally alined with said shaft journaled in said housing, said telescopic shaft having a universal joint connection at one end with said shaft and, at its other end, a universal joint connection and geared shaft drive with the first named driving shaft of the mechanism whereby, in the normal position of the truck on tangent section of track, the universal jointed telescopic shaft is maintained straight and the angular deflections therein are minimized when the truck runs over curved sections of track.

CARL W. SPOHR.